US012018634B2

(12) United States Patent
Rehwald et al.

(10) Patent No.: US 12,018,634 B2
(45) Date of Patent: Jun. 25, 2024

(54) FLUID DISTRIBUTOR FOR AN INJECTION SYSTEM AND INJECTION SYSTEM FOR MIXTURE-COMPRESSING, EXTERNALLY IGNITED INTERNAL COMBUSTION ENGINES

(71) Applicant: Robert Bosch GmbH, Stuttgart (DE)

(72) Inventors: Andreas Rehwald, Bietigheim-Bissingen (DE); Ralf Weber, Ottweiler (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/043,693

(22) PCT Filed: Sep. 9, 2021

(86) PCT No.: PCT/EP2021/074813

§ 371 (c)(1),
(2) Date: Mar. 1, 2023

(87) PCT Pub. No.: WO2022/083934

PCT Pub. Date: Apr. 28, 2022

(65) Prior Publication Data

US 2023/0272766 A1 Aug. 31, 2023

(30) Foreign Application Priority Data

Oct. 19, 2020 (DE) ..................... 10 2020 213 168.6

(51) Int. Cl.
*F02M 55/02* (2006.01)
*F02M 69/54* (2006.01)

(52) U.S. Cl.
CPC .......... *F02M 55/025* (2013.01); *F02M 69/54* (2013.01)

(58) Field of Classification Search
CPC ............................. F02M 55/025; F02M 69/54
(Continued)

(56) References Cited

U.S. PATENT DOCUMENTS

2017/0159627 A1* 6/2017 Schultz .............. F02M 63/0225
2022/0307454 A1* 9/2022 Guzman Trevino ......................... F02M 55/005

FOREIGN PATENT DOCUMENTS

DE 102016115550 A1 2/2018
DE 102017125435 A1 5/2019
(Continued)

OTHER PUBLICATIONS

International Search Report for PCT/EP2021/074813, dated Dec. 1, 2021.

*Primary Examiner* — Hai H Huynh
(74) *Attorney, Agent, or Firm* — NORTON ROSE FULBRIGHT US LLP; Gerard A. Messina

(57) ABSTRACT

A fluid distributor rail for an injection system for mixture-compressing, externally ignited internal combustion engines for metering a highly pressurized fluid. The fluid distributor rail includes a base body, and at least one connector configured on the base body. The base body with the at least one connector configured on the base body is formed by single stage or multistage forging. At least one interior space of the base body and a hydraulic fluid passage which leads into the interior space via the at least one connector configured on the base body are formed on the base body by machining after the forging. At least one element for connection is formed at least in part by mechanical cold-forming on at least one connector configured on the base body.

10 Claims, 3 Drawing Sheets

(58) Field of Classification Search
USPC ........................................ 123/456, 457, 459
See application file for complete search history.

(56) References Cited

FOREIGN PATENT DOCUMENTS

| | | | |
|---|---|---|---|
| EP | 1258629 | A2 | 11/2002 |
| EP | 3647583 | A1 | 5/2020 |
| GB | 2581359 | A | 8/2020 |
| WO | 2020114650 | A1 | 6/2020 |

* cited by examiner

FLUID DISTRIBUTOR FOR AN INJECTION SYSTEM AND INJECTION SYSTEM FOR MIXTURE-COMPRESSING, EXTERNALLY IGNITED INTERNAL COMBUSTION ENGINES

FIELD

The present invention relates to a fluid distributor, in particular a fuel distributor rail, for an injection system serving mixture-compressing, externally ignited internal combustion engines. Specifically, the present invention relates to the field of injection systems for motor vehicles in which fuel is injected directly into combustion chambers of an internal combustion engine.

BACKGROUND INFORMATION

A method for producing a fuel distributor in which a distributor pipe is made from a forged blank is described in German Patent Application No. DE 10 2016 115 550 A1. Austenitic steels can be used here, for example austenitic steels having the material numbers 1.4301, 1.4306, 1.4307 or 1.4404. A central bore and connectors comprising threads are produced by cutting processing.

A fuel injection system for high-pressure injection of gasoline in internal combustion engines is described in European Patent No. EP 3 647 583 A1. A base body and a plurality of connecting parts connected to the base body are provided here. The connecting parts enable connection to a connecting line, which is otherwise connected to a high-pressure pump, or to injectors. The base body is produced by forging. The connecting parts are produced independently of the base body. The connecting parts can thus be made of an expensive material having high mechanical strength, while a material having ordinary mechanical strength is used for the base body. It is therefore possible to reduce production costs and nonetheless achieve high strength of the connecting parts.

SUMMARY

A fluid distributor according to the present invention and an injection system according to the present invention may have the advantage that an improved design and operation is made possible.

Advantageous further developments of the fluid distributor and the injection system specified are achieved by the measures disclosed herein.

The injection system according to the present invention is used for mixture-compressing, externally ignited internal combustion engines. The injection system according to the present invention serves to inject gasoline and/or ethanol and/or comparable fuels and/or to inject a mixture comprising gasoline and/or ethanol and/or comparable fuels. A mixture can be a mixture comprising water, for example. The term fluid in this context is therefore to be understood broadly. The fluid distributor according to the present invention is used for such injection systems.

According to an example embodiment of the present invention, at least the base body of the fluid distributor is made of a material that is preferably a corrosion-resistant steel (stainless steel), in particular an austenitic stainless steel. A non-corrosion-resistant steel can also be used with a suitable coating to protect against corrosion. The material can in particular be based on an austenitic stainless steel having the material number 1.4301 or 1.4307, or on a comparable stainless steel. A hydraulic connector provided on the base body can be configured as a high-pressure inlet, high-pressure outlet or other high-pressure connector. The base body is then preferably formed and further worked during production as a forged blank together with the high-pressure inlet and optionally one or more other high-pressure connectors.

The use of a material based on an austenitic stainless steel having the material number 1.4301 or 1.4307 or a comparable stainless steel can be advantageous over materials with higher strength, for example a material having the material number 1,4418, in that it results in lower costs and lower thermal expansion differences to a cylinder head, which reduces mechanical stress during operation. It is thus possible to implement higher pressures without incurring these disadvantages. However, in order to increase the hardness of the material even further, it is possible that the proposed solution nonetheless be used for materials with higher strength.

According to an example embodiment of the present invention, in the configuration of a fluid distributor with a forged base body, there are also significant differences to a soldered rail, in which a pipe for the soldered rail is machined and deburred before the attachment components are soldered on. The forged configuration can in particular enable a design for higher pressures. A significant difference to a high-pressure rail for compression ignition internal combustion engines is the choice of material and the processing, in particular the forging of a stainless steel. The general configuration of a high-pressure connector also differs fundamentally between the diesel fuel distributor for the compression ignition engine and a fluid distributor for the externally ignited engine.

A hydraulic fluid passage leading into the interior space of a connector enables a hydraulic connection. During operation, fluid can be guided via the connector into the interior space, for example, which can in particular take place at a high-pressure inlet, or out of the interior space. The hydraulic fluid passage leading into the interior space can also enable hydraulic communication, which in particular enables measurement of a pressure in the interior space at a pressure sensor connector.

A further development in which, on at least one connector configured on the base body, an element serving for connection which is formed at least in part by mechanical cold-forming is an external thread and that the external thread is formed at least in part, in particular at least substantially, by thread rolling, may have the advantage that a higher strength of the external thread can be achieved. This can ensure that no plastic deformations of the external thread are caused when first tightening during assembly or when repeatedly screwing and unscrewing during servicing, for example, as a result of which the thread would no longer be true to gauge. Depending on the application, the fluid distributor can also be made of a specific material for higher pressures. Similar advantages result in an advantageous further development, in which, on at least one connector configured on the base body, an element serving for connection which is formed at least in part by mechanical cold-forming is an internal thread and that the internal thread is formed at least in part, in particular at least substantially, by thread forming.

A proposed implementation of the increase in strength by means of mechanical cold-forming is especially suitable for a high-pressure connector and/or a pressure sensor connector of the fluid distributor, as indicated following the advantageous further developments wherein at least one connector configured on the base body, on which at least one element serving for connection is formed at least in part by mechanical cold-forming, is configured as a high-pressure connector and/or wherein at least one connector configured on the base body, on which at least one element serving for connection is formed at least in part by mechanical cold-forming, is configured as a pressure sensor connector.

In these cases, specifically, it is advantageous if both the thread, i.e., an external thread or an internal thread, and a sealing surface, in particular a conical sealing surface, are strengthened by means of mechanical cold-forming.

In particular, a roller burnishing or strength rolling process can significantly increase the hardness of a conical sealing surface and introduce compressive residual stresses there. These compressive residual stresses can counteract or partially compensate the bending stresses resulting from a spreading stress that occurs during screwing. This also makes it possible to prevent or at least minimize plastic deformation of the conical sealing surface. It can also prevent or at least minimize plastic spreading of the thread. The thread can thus remain true to gauge at least to the extent that the desired sealing effect on the sealing surface is maintained during screwing.

Thus, a further development according to the present invention, in which, on at least one connector configured on the base body, an element serving for connection which is formed at least in part by mechanical cold-forming is a sealing surface, in particular a conical sealing surface, and that the sealing surface is formed at least in part, in particular at least substantially, by roller burnishing, may be particularly advantageous. It is particularly advantageous here if both a sealing surface and a thread are formed on a connector in the proposed manner by mechanical cold-forming. A further development is particularly advantageous in which, on at least one connector configured on the base body, an element serving for connection which is formed at least in part by mechanical cold-forming, is a conical sealing surface, that a thread, in particular an external thread, is provided on this connector, and that the sealing surface is formed by mechanical cold-forming in such a way that compressive residual stresses are introduced at the sealing surface which, with respect to loads on the sealing surface and the thread specified for fastening, counteract bending stresses resulting from a spreading of the conical sealing surface in order to reduce a plastic spreading on the thread.

An advantageous further development of the present invention, in which at least one high-pressure connector, one pressure sensor connector and a plurality of valve connectors are provided, that the high-pressure connector, the pressure sensor connector and the plurality of valve connectors are configured on the base body and that the base body with at least the high-pressure connector, the pressure sensor connector and the plurality of valve connectors is formed by single stage or multistage forging from a single forged blank or as a single part, in particular has the advantage that cost-efficient production is possible. In particular off-tool production can be implemented.

Depending on the configuration of the fluid distributor, it is thus possible to achieve a local increase in hardness of at least one sealing face (sealing surface). An improvement of the surface quality, in particular a smoothing of the surface roughness, can be achieved as well. Moreover, a local increase in strength in the region of a load caused by operating and screw loads is possible. It is also possible that compressive residual stresses which counteract the bending stresses at the soft end of a connection cone are introduced. This is in particular advantageous in the case of a connector with an external thread if the geometry becomes thinner-walled toward the connection end, i.e., toward the end of the conical sealing surface.

The cold-forming of a sealing surface can in particular be carried out via a roller burnishing process, in which mechanical strengthening occurs by rolling by means of pressing. An external thread can in particular be produced by thread rolling, wherein the rollers press the thread form into the workpiece. An internal thread can be produced by thread forming, wherein a rigid tool comprising the thread form presses the thread form into the workpiece. Thread forming enables the production of small internal threads that cannot be rolled.

Pressure forming can thus advantageously be carried out by pressing, wherein at least one sealing surface and/or at least one external thread and/or at least one internal thread are worked or produced on the fluid distributor.

It is thus possible to realize a high load capacity without the need to produce and assemble separate connection or connecting parts. When forging, for instance, the forged blank or the single part can be finished after one to three strokes. This can be followed by machining, which can be substantially reduced to drilling, for example. Threads can then advantageously be produced by thread forming rather than machining. This also simplifies the processing of a stainless steel, in which the strength of the material would result in only short tool lives for thread cutting.

BRIEF DESCRIPTION OF THE DRAWINGS

Preferred embodiment examples of the present invention are explained in more detail in the following description with reference to the figures in which corresponding elements are provided with the same reference signs.

DETAILED DESCRIPTION OF EXAMPLE EMBODIMENTS

Figure 1:
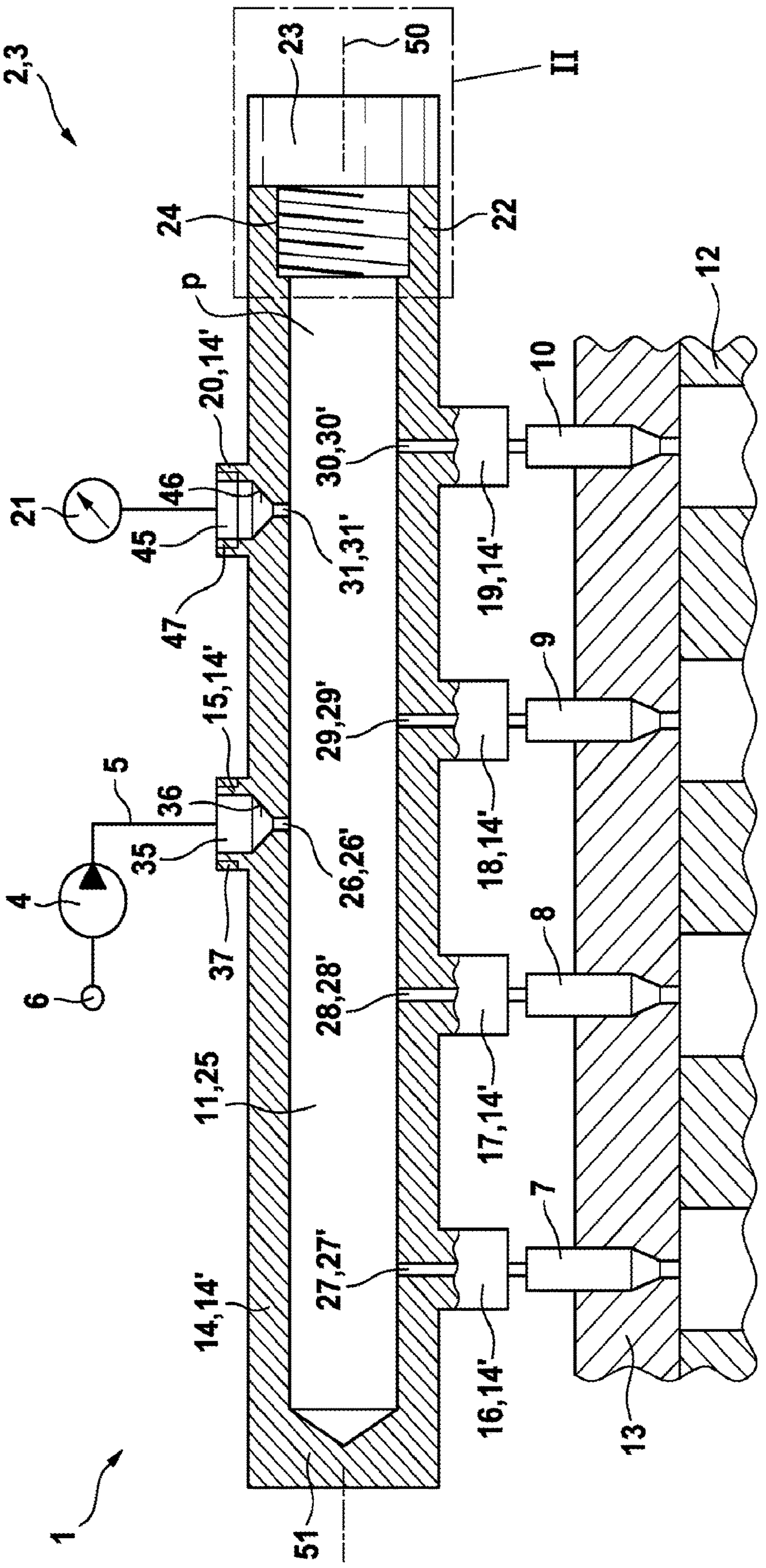
FIG. 1 shows an injection system for a mixture-compressing, externally ignited internal combustion engine comprising a fluid distributor in a schematic sectional view according to a first embodiment example of the present invention.

FIG. 1 shows an injection system 1 comprising a fluid distributor 2 in a schematic sectional view according to one possible configuration. In this embodiment, the fluid distributor 2 of the fuel injection system 1 a fuel distributor rail 3 configured according to the present invention. A high-pressure pump 4 is provided as well. The high-pressure pump 4 is connected to the fluid distributor 2 via a fuel line 5 configured as high-pressure line 5. During operation, a fuel, in particular gasoline and/or ethanol, or a mixture comprising fuel, is supplied as a fluid at an inlet 6 of the high-pressure pump 4.

The fluid distributor 2 serves to store and distribute the fluid to injection valves 7 to 10 configured as fuel injection valves 7 to 10 and reduces pressure fluctuations and pulsations. The fluid distributor 2 can also serve to dampen pressure pulsations that can occur when fuel injection valves 7 to 10 are switched. During operation, high pressures p can occur at least temporarily in an interior space 11 of the fuel distributor rail 3.

The fluid distributor 2 configured as the fuel distributor rail 3 comprises a tubular base body 14, which is formed by single stage or multistage forging and is subsequently mechanically worked. The fuel distributor rail 3 further comprises a high-pressure connector 15 which serves as a high-pressure inlet 15, and a plurality of valve connectors 16 to 19 which are provided on the tubular base body 14 and serve as high-pressure outlets 16 to 19. A pressure sensor connector 20 is provided on the tubular base body 14 as well.

In this embodiment example, according to a preferred embodiment of the present invention, the base body 14 with at least the high-pressure connector 15, the pressure sensor connector 20 and the plurality of valve connectors 16 to 19 is formed by single stage or multistage forging from a single forged blank 14'. As a result, the tubular base body 14, the high-pressure connector 15, the pressure sensor connector 20 and the valve connectors 16 to 19 are then formed from a forged single part 14'. The high-pressure connector 15, the pressure sensor connector 20 and the valve connectors 16 to 19 are thus forged to the base body 14. The production of the base body 14 can thus be based on a single material. There is also no need for material-locking production processes to assemble a base body from multiple single parts.

In a modified embodiment, the base body 14, the high-pressure connector 15 and the pressure sensor connector 20 are configured in this way as a single part 14'. In a further modified embodiment, the base body 14 and the high-pressure connector 15 are configured in this way as a single part 14'. In a further modified embodiment, the base body 14 and the pressure sensor connector 20 are configured in this way as a single part 14'. In one of these modified embodiments, the valve connectors 16 to 19 can in particular not be forged or only partially forged to the base body 14.

The valve connectors 16 to 19 are preferably implemented without threads, wherein connections to the injection valves 7 to 10 can be sealed via sealing rings. The connectors 16 to 19 can be configured here as cups 16 to 19, on which the injection valves 7 to 10 are suspended.

In this embodiment example, a pressure sensor 21 is provided which is connected to the pressure sensor connector 20 and measures the pressure p in the interior space 11 during operation. The tubular base body 14 is closed at one end 22 by a closure 23, which is configured in this embodiment example as a closure screw 23. In this case, an internal thread 24 can be formed at the end 22 of the tubular base body 14.

After forging, the tubular base body 14 or the forged single part 14' is worked by at least one machining process. In this embodiment, a bore 25 is furthermore formed in the tubular base body 14 after forging to create the interior space 11. During operation, the fluid supplied at the high-pressure inlet 15 can be distributed to the injection valves 7 to 10 connected at the high-pressure outlets 16 to 19 via the interior space 11. In this embodiment example, the injection system 1 is fastened in a suitable manner to an internal combustion engine 12, in particular to a cylinder head 13.

In addition, bores 26 to 31 are introduced into the forged single part 14' by a machining process. The bores 27 to 30 here serve as connecting bores 27 to 30 for the high-pressure outlets 16' to 19'. The bore 26 is used for the high-pressure inlet 15. The bore 31 is used for the pressure sensor connector 20. In this embodiment example, the bores 26 to 31 are components of hydraulic fluid passages 26' to 31'.

A bore 35, a conical sealing surface 36 and an external thread 37 are formed on the high-pressure connector 15. A bore 45, a conical sealing surface 46 and an internal thread 47 are formed on the pressure sensor connector 20. The bore 25 for the interior space 11 is oriented axially with respect to a longitudinal axis 50. In this embodiment example, the bores 35 and 37 are oriented radially with respect to the longitudinal axis 50.

The connectors 15 to 20 can be configured such that they are suitable for the respective application. Preferred configurations of the high-pressure connector 15 and the pressure sensor connector 20 are described with reference to FIGS. 2 and 3. The high-pressure connector 15, in particular, can also be disposed in the region labeled with II in accordance with a modified embodiment of the end 22. Instead of supplying the fuel under high pressure radially, as illustrated in FIG. 1, the fuel can then be supplied axially. An axial orientation of the pressure sensor connector 20 can additionally or alternatively be implemented as well in a corresponding manner, for example at the other end 51.

Figure 2:
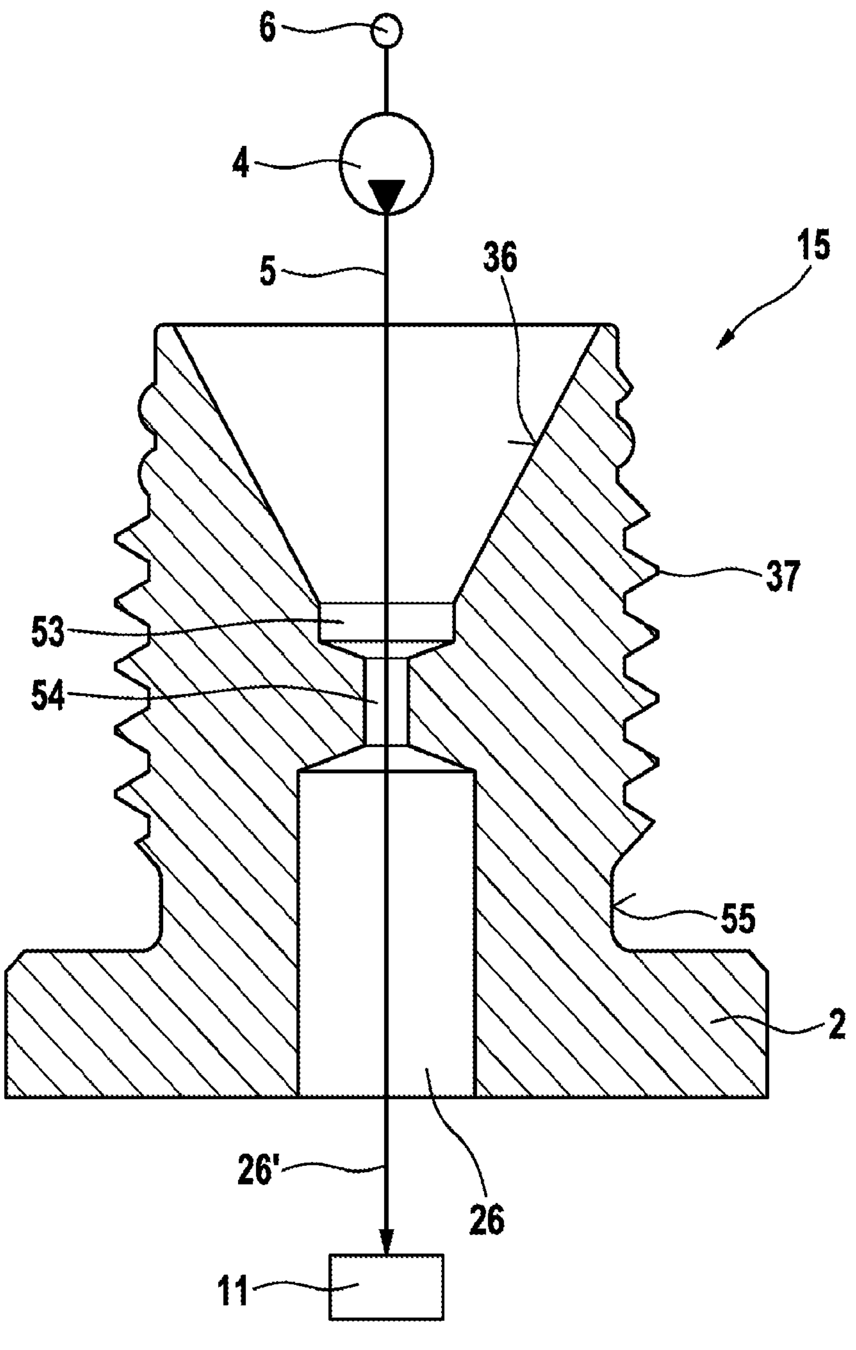
FIG. 2 shows a high-pressure connector of a fluid distributor according to a second embodiment example of the present invention in a schematic illustration.

FIG. 2 shows the high-pressure connector 15 of the fluid distributor 2 according to a second embodiment example in a schematic illustration. In this case, a hydraulic fluid passage 26' which enables fuel to be supplied to the interior space 11 is implemented at the high-pressure connector 15 (see FIG. 1). In this embodiment example, the high-pressure connector 15 comprises a cylindrical recess 53 which adjoins the conical sealing surface 36. In this embodiment example, a throttle bore 54 is provided between the cylindrical recess 53 and the bore 26 that opens into the interior space 11. The external thread 37 is formed on an outer side 55 of the high-pressure connector 15 by mechanical cold-forming. The high-pressure line 5 (FIG. 1) can thus be connected to the fluid distributor, wherein the connection at the conical sealing surface 36 is preferably implemented as a ball-cone connection.

The conical sealing surface 36 is preferably strain hardened by roller burnishing. This makes it possible to achieve very good surface qualities; at least in a relevant region, the conical sealing surface 46 can in particular be made to be nearly specular. This has a particularly favorable effect on the sealing point of a ball-cone connection. Compressive residual stresses furthermore develop underneath the worked conical sealing surface 36, which increase local strength and can in particular contribute to at least partially compensating tensile stresses that occur as a result of a bending load.

Local roller burnishing or strength rolling of the high-pressure connector 15, in particular at the conical sealing surface 36, can thus achieve a significant increase in the material hardness as well as an improvement in the surface properties without the need for additional joining processes or more expensive materials.

Roller burnishing or strength rolling processes or the like can be integrated into the machining of the forged blank 14' as appropriate. This can depend on whether the high-pressure connector 15 or correspondingly the pressure sensor connector 20 is disposed radially, axially or possibly in some other way, in particular radially eccentrically, on the tubular base body 14 of the fluid distributor 2. If appropriate, a roller burnishing or strength rolling process or the like can also be carried out as a final processing operation (finishing) after machining, which can optionally be carried out at a dedicated processing station.

Figure 3:
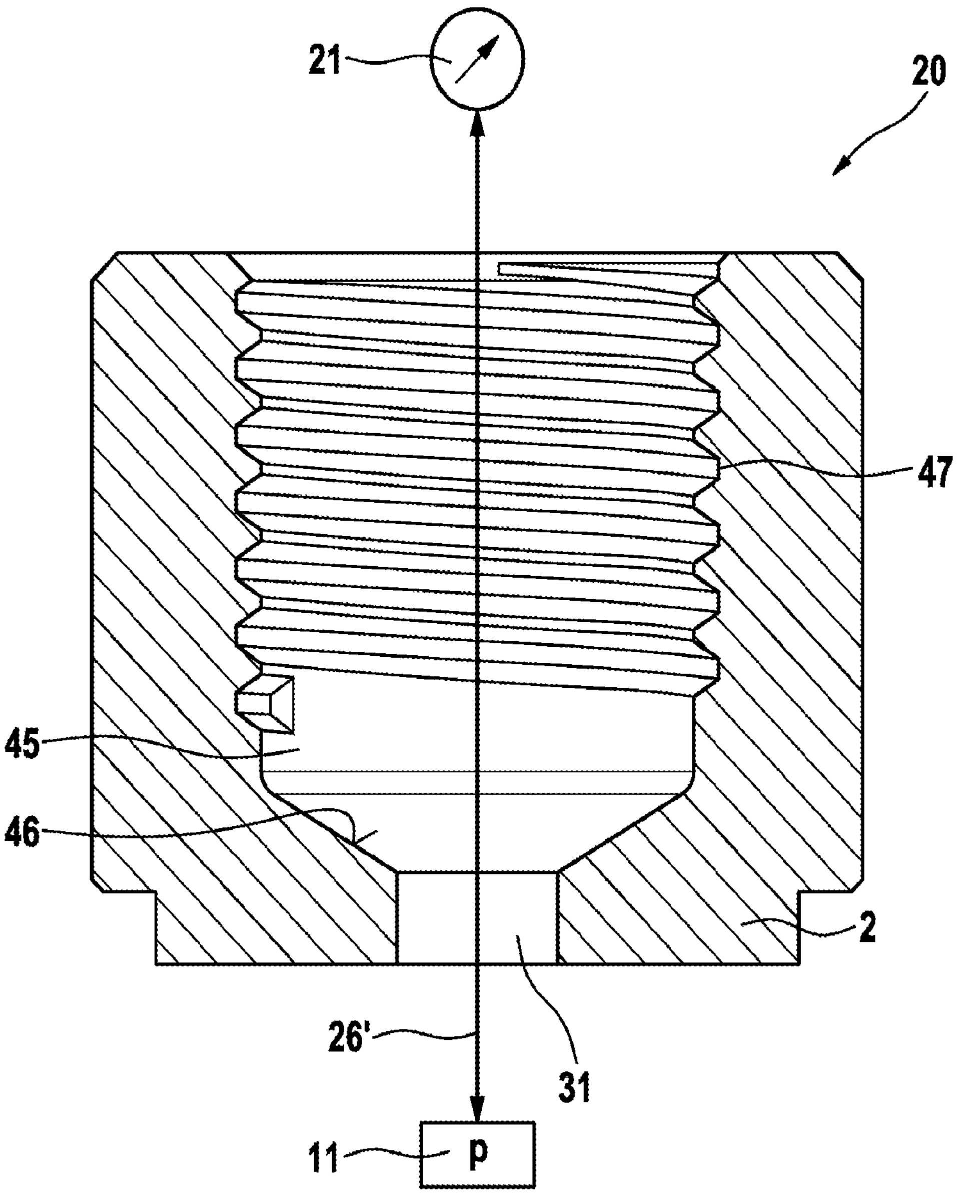
FIG. 3 shows a pressure sensor connector of a fluid distributor according to a third embodiment example of the present invention in a schematic illustration.

FIG. 3 shows the pressure sensor connector 20 of the fluid distributor 2 according to a third embodiment example in a schematic illustration, wherein a hydraulic fluid passage 31 to the interior space 11 is implemented (see FIG. 1), so that, when the pressure sensor 21 is installed, the pressure p in the interior space 11 can be measured by the pressure sensor 21. In this embodiment example, the thread 47 is formed as an internal thread 47 by mechanical cold-forming. It is preferable to use thread forming here. In this process, the material of the forged blank 14' is displaced and deformed or reshaped in such a way that not only a shaping but also a certain compression of the material is achieved.

The external thread 37 of the high-pressure connector 15 and the internal thread 47 of the pressure sensor connector 20 can optionally be formed on the forged blank 14' without thread cutting. In a modified embodiment, however, it is possible for the threads 37, 47 to be partially precut by machining if this is practical in the particular application. Even so, especially in the case of high-strength materials, it makes sense not to precut the threads, because this is an additional processing step and, particularly in the case of high-strength materials, the tool life for thread cutter or the like is reduced.

Depending on the design of the mechanical cold-forming process, specific material and/or surface properties can result, in particular on the threads 37, 47 and the conical sealing surfaces 36, 46, which differ significantly from those that result from a machining process. For example, a nearly specular surface can be achieved. A depth profile of the residual stresses and a shape and height of surface roughnesses as well as the achieved strengthening and the local microstructure of the structure can moreover be characteristically pronounced.

The present invention is not limited to the described possible configurations and embodiment examples.

The invention claimed is:

1. A fluid distributor for an injection system for a mixture-compressing, externally ignited internal combustion engine, which meters a fluid under high pressure, the fluid distributor comprising:

a base body;

at least one connector configured on the base body, wherein the base body with the at least one connector configured on the base body is formed by single stage or multistage forging, wherein at least one interior space of the base body and a hydraulic fluid passage which leads into the interior space via the at least one connector configured on the base body are formed on the base body by machining after the forging; and at least one element configured for connection is formed at least in part by mechanical cold-forming on at least one connector configured on the base body.

2. The fluid distributor according to claim 1, wherein the fluid distributor is a fuel distributor rail.

3. The fluid distributor according to claim 1, wherein, on the at least one connector configured on the base body, the element configured for connection formed at least in part by mechanical cold-forming is an external thread, and that the external thread is formed at least in part, at least substantially, by thread rolling.

4. The fluid distributor according to claim 1, wherein, on at least one connector configured on the base body, the element configured for connection which is formed at least in part by mechanical cold-forming is an internal thread, and that the internal thread is formed at least in part, at least substantially, by thread forming.

5. The fluid distributor according to claim 1, wherein, the at least one connector configured on the base body, on which the at least one element configured for connection is formed at least in part by mechanical cold-forming, is a high-pressure connector.

6. The fluid distributor according to claim 1, wherein the at least one connector configured on the base body, on which the at least one element configured for connection is formed at least in part by mechanical cold-forming, is a pressure sensor connector.

7. The fluid distributor according to claim 1, wherein, on the at least one connector configured on the base body, the element configured for connection which is formed at least in part by mechanical cold-forming is a conical sealing surface, and the sealing surface is formed, at least substantially, by roller burnishing.

8. The fluid distributor according to claim 1, wherein, on the at least one connector configured on the base body, the element configured for connection which is formed at least in part by mechanical cold-forming, is a conical sealing surface, an external thread for fastening, is provided on the at least one connector, and the sealing surface is formed by mechanical cold-forming in such a way that compressive residual stresses are introduced at the sealing surface which, with respect to loads on the sealing surface and the thread for fastening, counteract bending stresses resulting from a spreading of the conical sealing surface, to reduce a plastic spreading on the thread.

9. The fluid distributor according to claim 1, wherein at least one high-pressure connector, one pressure sensor connector, and a plurality of valve connectors are provided as the at least one connector, the high-pressure connector, the pressure sensor connector, and the plurality of valve connectors are configured on the base body, and the base body with at least the high-pressure connector, the pressure sensor connector and the plurality of valve connectors is formed by single stage or multistage forging from a single forged blank or as a single part.

10. An injection system configured for a mixture-compressing, externally ignited internal combustion engine, configured to inject a fluid that is fuel including gasoline and/or ethanol and/or a mixture comprising fuel, comprises:

at least one fluid distributor which meters the fluid under high pressure, the fluid distributor, including:

a base body, at least one connector configured on the base body, wherein the base body with the at least one connector configured on the base body is formed by single stage or multistage forging, wherein at least one interior space of the base body and a hydraulic fluid passage which leads into the interior space via the at least one connector configured on the base body are formed on the base body by machining after the forging, and at least one element configured for connection is formed at least in part by mechanical cold-forming on at least one connector configured on the base body.

* * * * *